United States Patent
Zhang et al.

(10) Patent No.: US 10,070,143 B2
(45) Date of Patent: Sep. 4, 2018

(54) BIT STREAM SWITCHING IN LOSSY NETWORK

(71) Applicant: Apple Inc., Cupertino, CA (US)

(72) Inventors: Dazhong Zhang, Milpitas, CA (US); Jae Hoon Kim, San Jose, CA (US); Peikang Song, San Jose, CA (US); Xiaosong Zhou, Campbell, CA (US); Chris Chung, Sunnyvale, CA (US); Hsi-Jung Wu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 276 days.

(21) Appl. No.: 15/168,872

(22) Filed: May 31, 2016

(65) Prior Publication Data

US 2017/0347112 A1    Nov. 30, 2017

(51) Int. Cl.
*H04N 19/46* (2014.01)
*H04N 19/68* (2014.01)
*H04L 5/00* (2006.01)
*H04L 29/06* (2006.01)
*H04L 12/741* (2013.01)

(52) U.S. Cl.
CPC ........... *H04N 19/46* (2014.11); *H04L 5/0055* (2013.01); *H04L 45/745* (2013.01); *H04L 65/608* (2013.01); *H04N 19/68* (2014.11)

(58) Field of Classification Search
CPC ....... H04N 19/46; H04N 19/68; H04N 45/745
See application file for complete search history.

*Primary Examiner* — Nam Pham
(74) *Attorney, Agent, or Firm* — Baker & Hostetler LLP; Robert L. Hails

(57) ABSTRACT

Coding and decoding techniques are disclosed in which a plurality of coding parameter sets is transmitted between an encoder and a decoder, each of which is distinguishable from the others by a respective identifier. When a new frame of video is to be coded, an encoder may identify a coding parameter set to be applied during coding, it may code the new frame according to the identified coding parameter set, and it may transmit the coded frame to the decoder along with an identifier of the coding parameter set used during the coding. A plurality of coding parameter sets is persistent at an encoder and the decoder simultaneously.

22 Claims, 5 Drawing Sheets

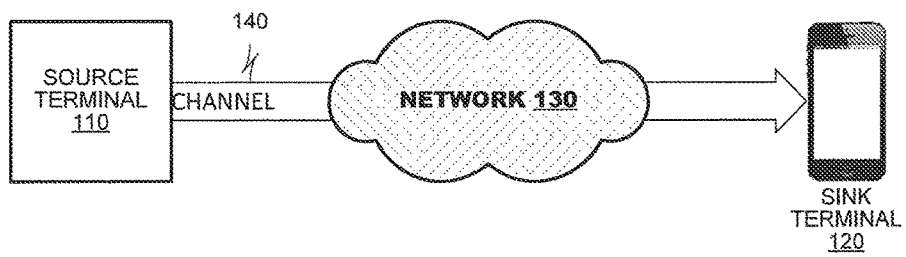
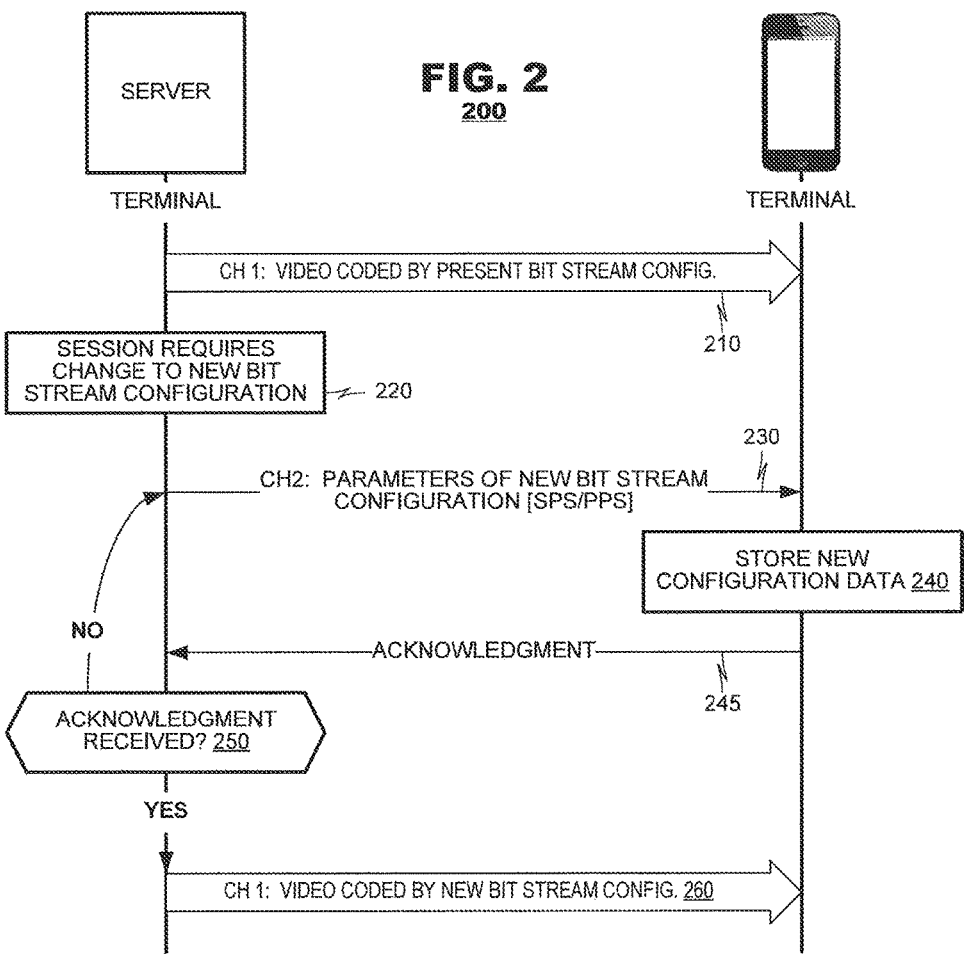

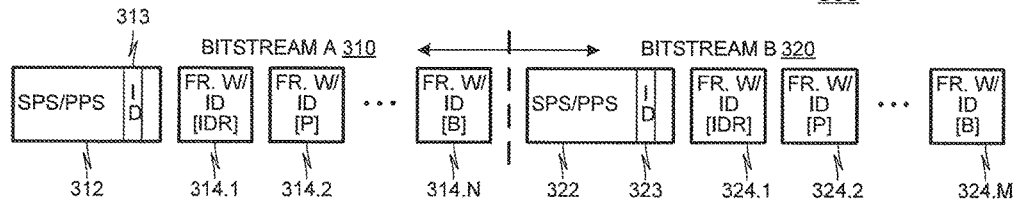
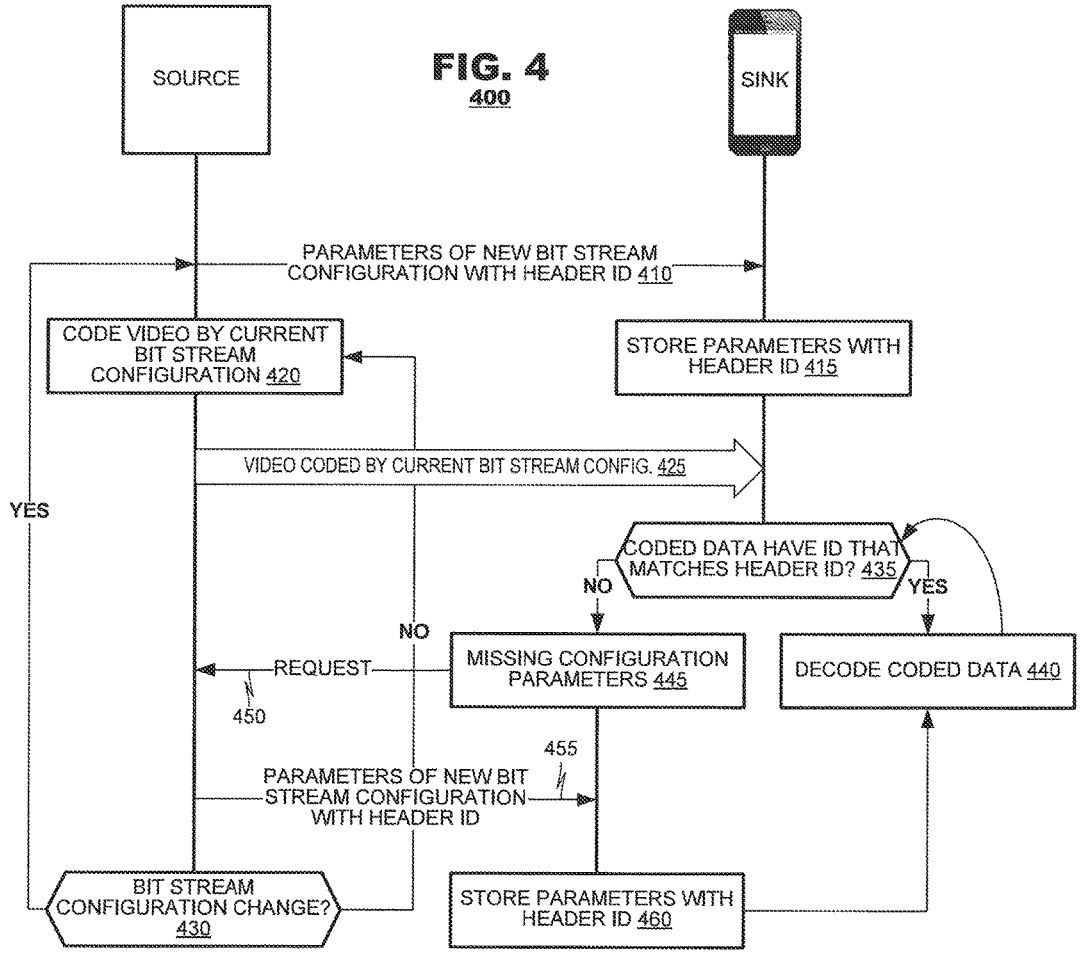

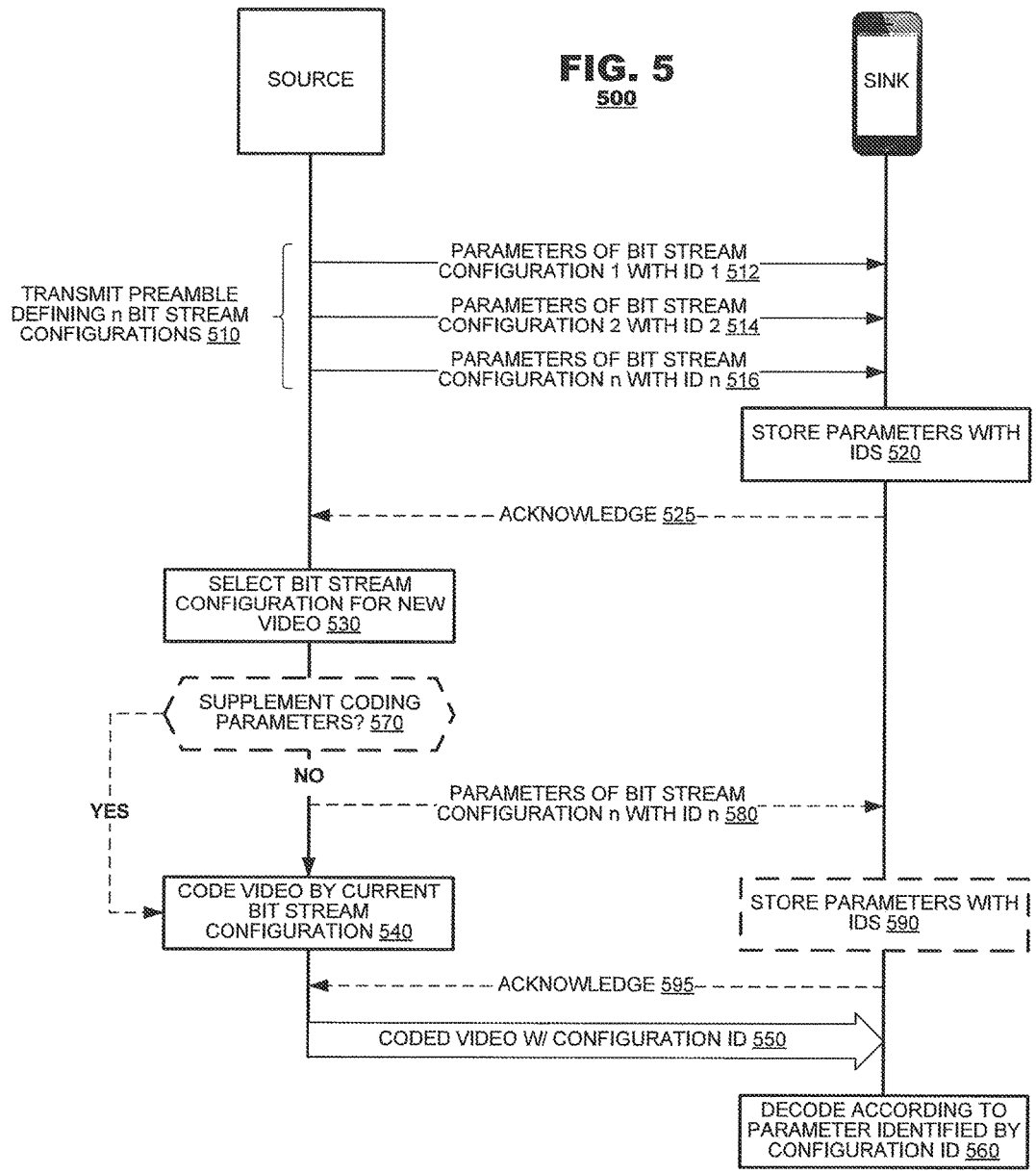

600

700

800

BIT STREAM SWITCHING IN LOSSY NETWORK

BACKGROUND

The present disclosure relates to video coding systems and related protocols.

Many modern electronic devices support video coding protocols. Implementations vary but, typically, a first device captures video data at a local location and applies data compression operations upon the video data to transmit the video data to a second device over a bandwidth-limited channel. The second device inverts coding operations that were applied by the first device to generate recovered video data that can be displayed locally.

Oftentimes, transmission errors can arise that cause loss of data when the coded video data is delivered to the second device. Real-time video communication applications often use lossy network protocol stacks such as the Real-time Transport Protocol, the User Datagram Protocol and the Internet Protocol (RTP/UDP/IP). To transmit coded video, various portions of a coded bit stream (such as an HEVC coded bit stream) may be allocated to transmission units (perhaps packets), which are formatted for transmission and transmitted from the first device to the channel. Transmission errors may arise that cause some packets to be lost in transmission and, as a consequence, cause some elements of the coded bit stream to exhibit corruption. Thus, some syntactic elements of the coded bit stream, such as coded frames or administrative data, might not be recovered from the transmission data that is received at the second device.

Some transmission errors may be more significant than others due to data dependencies that are created by a coding protocol. For example, when a transmission error arises with respect to a pixel block in a single frame, the transmission error may not have a significant impact on coding performance particularly if other content of the video session does not rely on the corrupted pixel block. If a transmission error arises with respect to coding elements on which a large number of other coding elements arise, the transmission error can cause loss of a significant amount of data.

The inventors have identified sequence parameter datasets (SPSs) and picture parameter datasets (PPSs) as coding elements that can give rise to large losses of data in coding applications. They have identified a need to develop coding protocols to protect against coding corruption events that can occur due to loss of SPS and/or PPS data in transmission.

BRIEF DESCRIPTION OF THE DRAWINGS

FIG. 1 illustrates a video coding system according to an embodiment of the present disclosure.

FIG. 2 illustrates a method according to an embodiment of the present disclosure.

FIG. 3 illustrates a coding protocol according to another embodiment of the present disclosure.

FIG. 4 is a flow diagram illustrating a method of operation according to an embodiment of the present disclosure.

FIG. 5 illustrates a method according to another embodiment of the present disclosure.

DETAILED DESCRIPTION

Figure 6:
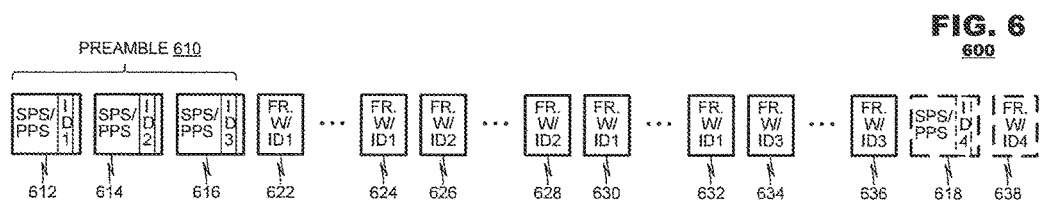
FIG. 6 illustrates an exemplary coding session that may be created according to an embodiment of the present disclosure.

Embodiments of the present disclosure provide coding and decoding techniques in which a plurality of coding parameter sets is transmitted between an encoder and a decoder, each of which is distinguishable from the others by a respective identifier. When a new frame of video is to be coded, an encoder may identify a coding parameter set to be applied during coding, it may code the new frame according to the identified coding parameter set, and it may transmit the coded frame to the decoder along with an identifier of the coding parameter set used during the coding. A plurality of coding parameter sets is persistent at an encoder and the decoder simultaneously.

FIG. 1 illustrates a video coding system 100 according to an embodiment of the present disclosure. The system 100 may include a pair of terminals 110, 120 provided in mutual communication by a network 130. For unidirectional transmission of video, the first terminal 110 may code video data at a local location for transmission to the other terminal 120 via the network 130. The second terminal 120 may receive the coded video data of the first terminal 110 from the network 150, decode the coded data and display or store the recovered video data locally at the terminal 120. Coding and decoding operations may operate according to a predetermined coding protocol such as an MPEG coding standard, AVC, HEVC and the like. Unidirectional data transmission is common in media serving applications and the like. For convenience, the first terminal 110 is called a "source" and the second terminal 120 is called a sink to distinguish their respective roles in unidirectional data transmission.

The embodiments described herein also find application in bidirectional exchange of coded video that may occur, for example, during videoconferencing. For bidirectional transmission of data, each terminal 110, 120 may code video data captured at a local location for transmission to the other terminal via the network 130. Each terminal 110, 120 also may receive the coded video data transmitted by the other terminal, may decode the coded data and may display or store the recovered video data locally at the terminal 110, 120. In bidirectional exchanges (not shown in FIG. 1), both terminals would operate as a "source" and a "sink."

In FIG. 1, the terminals 110-120 are illustrated as servers and smart phones but the principles of the present disclosure are not so limited. Embodiments of the present disclosure find application with personal computers, laptop computers, tablet computers, media players and/or dedicated video conferencing equipment. The network 130 represents any number of networks that convey coded video data among the terminals 110-120, including for example wireline and/or wireless communication networks. The communication network 150 may exchange data in circuit-switched and/or packet-switched channels. Representative networks include telecommunications networks, local area networks, wide area networks and/or the Internet. For the purposes of the present discussion, the architecture and topology of the network 130 is immaterial to the operation of the present disclosure unless explained herein below.

FIG. 2 illustrates a method 200 according to an embodiment of the present disclosure, which may occur when a coding event causes revision of SPS or PPS data ("configuration" data, for convenience). Thus, the method 200 may be invoked when the source terminal is coding video and transmitting the coded video to a sink terminal (msg. 210) and the source terminal determines that coding parameters of the coding session must change (box 220). According to the method 200, the source terminal may transmit new configuration data to the sink terminal in a second channel defined by the network 130 (FIG. 1) (box 230), whereupon the sink terminal stores the new configuration data locally (box 240).

The source terminal may transmit the new configuration data in a channel of the network 130 (shown as "Ch. 2" in FIG. 2) that is different from the channel ("Ch. 1") that is used to transmit coded video data to the sink terminal in msg. 210. The second channel Ch. 2 may be provisioned to have higher reliability within the network 130 than the first channel Ch. 1, for example, by allocating a relatively higher quality of service to the second channel Ch. 2. The second channel Ch. 2, for example, may operate according to a protocol that requires the sink terminal to transmit an acknowledgment message 245 to the source terminal upon receipt of the configuration message 230 or upon successful storage of the new configuration data in box 240. The source terminal may await reception of the acknowledgment (box 250) and, once the acknowledgement is received, may code video data according to the new configuration and transmit the coded video data to the sink terminal (box 260).

If, at box 250, the acknowledgement message is not received within an expected amount of time after transmitting the new configuration data in the second channel Ch. 2, the source terminal may retransmit parameters of the new configuration in a second message transmitted in the second channel Ch. 2 (box 230). The source terminal may continue to transmit and retransmit new configuration data in the second channel until successful transmission is acknowledged. During this time, the source terminal may continue to code video data according to the former set of configuration parameters until successful transmission is acknowledged.

In other embodiments, rather than providing for an explicit acknowledgment message, the second channel Ch. 2 may provide higher quality of service by providing relatively higher performance in transmission delay, message loss probability and/or bit error rate as compared to the first channel Ch. 1.

Configuration parameter messages may carry information that define one or more of the following characteristics of coded frames: frame size and resolution, frame rate, frame format (e.g., PAL vs. SECAM), entropic codes, profile/level, chroma format, bit-depth, scaling-matrix, number of reference frames, frame cropping parameters, weighted prediction, number of slice groups, chroma quantization paramger (QP) offset, and/or deblocking filter control.

FIG. 3 illustrates a coding protocol 300 according to another embodiment of the present disclosure. According to the protocol, different sets of coding parameters may have parameter identifiers assigned to them, which may provide a basis for identifying transmission errors involving such parameters. FIG. 3 illustrates two exemplary bit streams 310 and 320. In this example, the bit streams are members of a common video coding session but have different coding parameters defined for them. The parameters may be defined, for example, in SPS and/or PPS fields of a governing coding protocol.

The first bit stream 310 is illustrated has having a parameter header 312, a plurality of coded video frames 314.1-314.N. Similarly, the second bit stream 320 is illustrated as having its own parameter header 322, a plurality of coded videos frames 324.1-324.M. The parameter headers 312, 322 each may contain data (not shown) defining parameters for decoding the frames 314.1-314.N, 324.1-324.M of their respective bit streams 310, 320.

In an embodiment, the parameter headers 312, 322 each may have an identifier field 313, 323 that contains an identifier that distinguishes the parameter header 312 from other parameter headers 322 of the video coding session. Coded frames within a common bit stream as their respective parameter header also may contain identifiers that associate the frames with their parameter header. Thus frames 314.1-314.N may contain an identifier that associates those frames with the identifier 313 of parameter header 312 and frames 324.1-324.M may contain an identifier that associates these frames with the identifier 323 of parameter header 322.

FIG. 4 is a flow diagram illustrating a method of operation according to an embodiment of the present disclosure. The flow diagram illustrates signal flow that may extend between a source terminal and a sink terminal and operations that may be performed by the source and/or sink terminal in response to such signal flow.

The method 400 may begin with the source terminal transmitting a message 410 to a sink terminal that includes parameters of a new bit stream configuration and also a header ID. In response to the message 410, the sink terminal may store those parameters locally at the terminal, along with the header ID (box 415). Thereafter, the source terminal may code new video according to the current bit stream configuration (box 420) and transmit coded video that was coded according to the bit stream configuration (msg. 425). The operations represented by box 420 and message 425 may continue as long as the source terminal determines to code video according to a common set of coding parameters (box 430). When the source terminal determines to code video according to a new set of coding parameters, the source terminal may transmit a new message 410 identifying the new coding parameters, along with a new header ID.

At the sink terminal, when a new frame of coded video data is received (msg. 425), the sink terminal may determine whether the coded frame has an ID that matches a most-recently received header ID (box 435). If so, the sink terminal may decode the coded frame using parameters that were stored in box 415 (box 440). If not, then the sink terminal may determine that an error condition exists because configuration parameters necessary to decode the frame are missing (box 445). The sink terminal may send a message to the source terminal requesting missing configuration parameters (msg. 450). In response, the source terminal may sent a new message 445 that provides configuration parameters to be used during decode of the coded frame, along with its header ID. The sink terminal may store the configuration parameters locally at the terminal with its header ID (box 460) and may decode the coded frame (box 440).

FIG. 5 illustrates a method 500 according to another embodiment of the present disclosure. According to the method 500, a source terminal may transmit configuration parameters associated with a predetermined number (N) of different bit streams in an early portion of a video coding session, for example, before any coded video data is transmitted in a channel (msgs. 512, 514, 516). The configuration parameters may be stored locally by a sink terminal (box 520). Thereafter, as new video data is presented for coding, the source terminal may select which of the bit stream configurations is best suited for coding the new video (box 530) and may code the video data by that bit stream configuration (box 540). The source terminal may transmit the coded video to the sink terminal, along with an identifier of the bit stream configuration that was used for coding (msg. 550). The sink terminal may decode the coded video according to configuration parameters that are identified by the identifier provided in the coded video (box 560).

The foregoing operations allow a source terminal to define a predetermined number of coding configurations at the onset of a video coding session, then toggle among the coding configurations as coding circumstances dictate. To switch among coding configurations in the midst of a coding session, the source terminal may simply apply coding parameters from a newly selected configuration and supply coded video data to the sink terminal along with the ID that identifies the coding parameters.

FIG. 6 illustrates an exemplary coding session that may be created according to the embodiment of FIG. 5. FIG. 6 illustrates a preamble section of a video coding session that includes a plurality of transmitted configuration parameter sets 612, 614, 616, each having their own coding parameter data and identifiers. Following the preamble 610 section, the session may include a plurality of coded frames 622-636. Each coded frame may include an identifier that relates the frame to the configuration parameter set that was previously transmitted. For example, frames 622-624 and 630-632 each may include identifiers that relate those frames to configuration parameter set 612. Frames 626-628 may include identifiers that relate those frames to configuration parameter set 614 and frames 634-636 may include identifiers that relate those frames to configuration parameter set 616.

In an embodiment, a source terminal may supplement the set of coding parameters that it uses during coding throughout the course of a coding session. For example, when receiving new video data, as a source terminal estimates a coding configuration for use to code the frame, the source terminal may determine whether to supplement the sets of coding configuration parameters that have been transmitted already during the video coding session (FIG. 5, box 570). If the source terminal determines to supplement the set of coding parameters, the source terminal may transmit a new message 580 to the sink terminal, providing a new set of configuration parameters along with a new ID. The sink terminal may store the new configuration parameter set locally, along with its identifiers (box 590). Thereafter, when the source terminal codes video data and the sink terminal decodes it, the coding and decoding may be performed with reference to the supplemented configuration parameter set identified in message 580.

FIG. 6 also illustrates exemplary signaling that supplements the coding parameter sets in the midst of a coding session. In this example, following transmission of coded frame 626, a new configuration parameter set 618 is shown as being transmitted, which includes a new identifier. The next transmitted coded frame 638 may be coded with reference to the new coding parameter set 618.

In one embodiment, it may be efficient to provide configuration parameters only on an as needed basis, when a source terminal determines to supplement coding parameters. In such an embodiment, rather than transmit a plurality of configuration parameters at the beginning of a coding session, it is sufficient to transmit a single configuration parameter set at the beginning of a session (N=1 in FIG. 5) and transmit coded video data according to that first configuration parameter set. Thereafter, the source terminal may expand the number of configuration parameters sets as it determines to add configuration parameter sets. Thus, the size of a preamble (FIG. 6) may be minimized, which contributes to reduced latency because coded frame data may transmitted to a sink terminal without undue delay.

Figure 7:
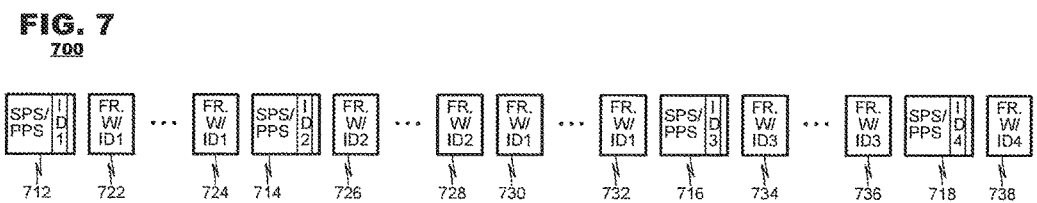
FIG. 7 illustrates an exemplary coding session that may be created another embodiment of the present disclosure.

FIG. 7 illustrates such an embodiment. In this embodiment, a single configuration parameter set 712 is transmitted, which is sufficient to define coding parameters of a first frame 722 to be coded. In the example of FIG. 7, the configuration parameter set 712 is sufficient for coding of a plurality of frames 722-724. Thereafter, a new configuration parameter set 714 is created, which is sufficient to code frames 726-728. After transmission of coded frame 728, frames 730-732 are shown having been coded with respect to the first configuration parameter set 712; no new configuration parameter set 712 is transmitted between frames 728 and 730. New configuration parameter sets 716 and 718 are added as circumstances warrant, which in this example provide bases for coding frames 734-736 and 738, respectively.

Returning to FIG. 5, the principles of the embodiment disclosed also accommodate features described in the foregoing figures. For example, a sink terminal may transmit acknowledgement messages 525, 595 when new configuration parameter sets are stored successfully at the sink terminal. And, although not illustrated in FIG. 5, a sink terminal may correlate identifiers from received frames to the identifiers of the parameter sets that it stores locally; if a sink terminal determines that it does not store a coding parameter set that corresponds to an identifier received in a coded frame, the sink terminal may request the coding parameter set from the source terminal (message not shown). In another embodiment, configuration parameter sets may be transmitted in a logical channel of a communication network that is provisioned to have reliability than channel(s) provided for transmission of coded video data.

In another embodiment, the source and sink terminal may operate according to a protocol that limits a number of concurrently persistent coding parameter sets to a predetermined number (say, 32 coding parameter sets). Over time, a source terminal may transmit new coding parameter sets to a sink terminal. When a new coding parameter set is generated that exceeds the maximum number of persistent sets, a source terminal may disqualify an older coding parameter set from further use and transmit the new coding parameter set to the sink terminal. The disqualified coding parameter set may be identified expressly in a coded bit stream or, alternatively, it may be inferred from operational parameter of the video coding session. For example, the disqualified coding parameter set may be identified as the coding parameter set that is oldest, as the coding parameter set that is least-recently used at the time of disqualification or on some other basis. In another implementation, a new coding parameter data set may re-use an identifier that belongs to a disqualified data set; such an embodiment may require a sink terminal to acknowledge reception of the new coding parameter set before coding data under the identifier to guard against error conditions that otherwise might arise if transmission of the new coding parameter set encountered an error.

In another embodiment, the parameter set IDs (SPS_ID, PPS_ID for example) may be jointly selected to represent certain parameter values of interest, like resolution/color format/bit-depth/etc, as a way for error resilience. When decoder receives a coded frame, it may extract the referred parameter sets, derive the target parameter values from the parameter set IDs, and check against the actual parameter values in the parameter sets. As an example, SPS_ID and PPS_ID may be selected such that (SPS_ID*256+PPS_ID) represent the video resolution in number of macroblocks. This same information can also be calculated from the parameter sets elements. By comparing these, the video decoder will be able to detect potential wrong parameter sets being used during the decoding. When such an error condition is detected, the decoder may recover from the error condition by requesting retransmission of the parameter set.

To further help the video decoder with the capability of detecting wrong parameter sets being used, each coded frame may optionally choose to explicitly specify all parameter set IDs. Modern coding protocols, for example, H.264 and HEVC, only allow PPS_ID to be specified in each frame.

Figure 8:
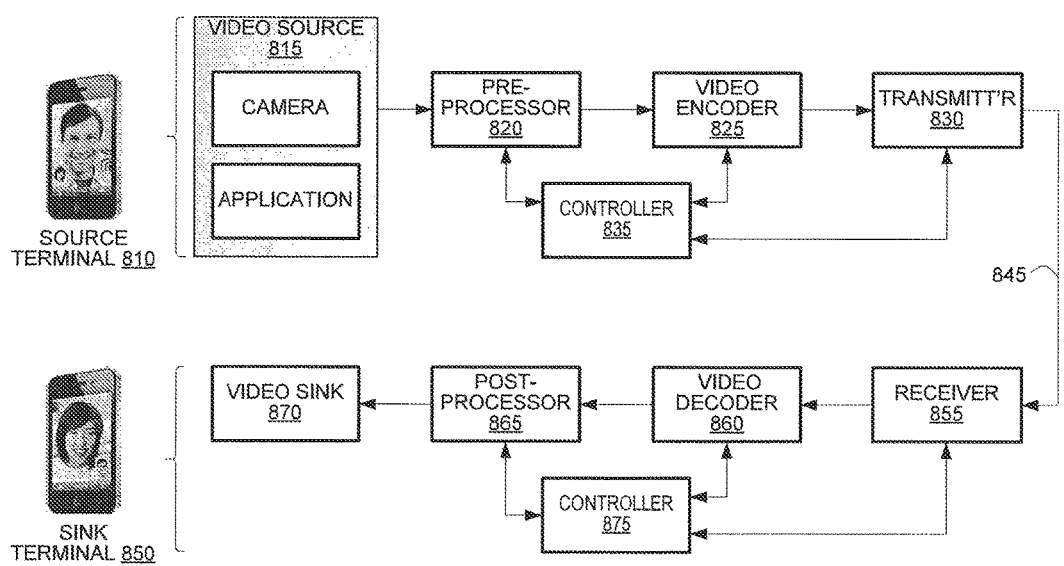
FIG. 8 is a functional block diagram of source and sink terminals according to an embodiment of the present disclosure.

FIG. 8 is a functional block diagram of source and sink terminals 810, 850 that operate according to an embodiment of the present disclosure. A source terminal 810 may include a video source 815, a preprocessor 820, a video encoder 825, a transmitter 830 and a controller 835. The video source 815 may generate a video sequence for coding. The preprocessor 820 may perform various processing operations that condition the input signal for coding. The encoder 825 may perform data compression operations to reduce the bitrate of the video sequence output from the preprocessor 820. The transmitter 830 may transmit coded video data to another terminal 850 via a channel 845 provided by a network. The controller 835 may coordinate operation of the source terminal 810 as it performs these functions.

Typical video sources 815 include image capture systems, such as cameras, that generate video from locally-captured image information. They also may include applications that execute on the source terminal 810 and generate image information to be exchanged with a far-end terminal 850. Alternatively, the video source 815 may include storage devices (not shown) in which video may be stored, e.g., the video was generated at some time prior to the onset of a coding session. Thus, source video sequences may represent naturally-occurring image content or synthetically-generated image content (e.g., computer generated video), as application needs warrant. The video source also may provide the source video to other components within the source terminal 810 such as a display (path not shown).

As indicated, the preprocessor 820 may perform video processing operations upon the camera video data to improve quality of the video data or to condition the video data for coding. The preprocessor 820 also may perform analytical operations on the video that it receives from the video source 815 to determine, for example, a size of the video, frame rate of the data, rates of change of content within the video, and the like. In response to analytical operations, the controller may determine that coding configuration of a video coding session must change, which may cause it to alter and, as discussed hereinabove, expand a set of configuration parameter sets at work in the video coding session. The preprocessor may alter video characteristics, particularly frame rate and/or frame size, as may be needed to tailor coded video to parameters defined in a selected coding parameter sets. Optionally, the preprocessor 820 may perform other processes to improve quality of the video data such as motion stabilization and/or filtering. Filtering operations may include spatial filtering, temporal filtering, and/or noise detection and removal.

The encoder 825 may code frames of video data to reduce bandwidth of the source video and meet the target bitrate. In an embodiment, the encoder 825 may perform content prediction and coding.

Prediction and coding operations may reduce the bandwidth of the video sequence by exploiting redundancies in the source video's content. For example, coding may use content of one or more previously-coded "reference frames" to predict content for a new frame to be coded. Such coding may identify the reference frame(s) as a source of prediction in the coded video data and may provide supplementary "residual" data to improve image quality obtained by the prediction. Coding may operate according to any of a number of different coding protocols, including, for example, MPEG-4, H.263, H.264 and/or H.265. Such coding operations typically involve executing a transform on pixel data to another data domain as by a discrete cosine transform or a wavelet transform, for example. Transform coefficients further may be quantized by a variable quantization parameter and entropy coding. Each protocol defines its own basis for parsing input data into pixel blocks prior to prediction and coding. The principles of the present disclosure may be used cooperatively with these approaches.

The coding operations may include a local decoding of coded reference frame data (not shown). Many predictive coding operations are lossy operations, which causes decoded video data to vary from the source video data in some manner. By decoding the coded reference frames, the source terminal 810 stores a copy of the reference frames as they will be recovered by the sink terminal 850.

The transmitter 830 may format the coded video data for transmission to another terminal. Again, the coding protocols typically define a syntax for exchange of video data among the different terminals. Additionally, the transmitter 830 may package the coded video data into packets or other data constructs as may be required by the network. Once the transmitter 830 packages the coded video data appropriately, it may release the coded video data to the network 130 (FIG. 1).

The transmitter 830 may estimate periodically an amount of bandwidth that is available within the network 130 (FIG. 1) for transmission of coded video to the other terminal 850. The transmitter 830 may estimate this bandwidth level, for example, from indications of bit error rate and negative acknowledgements that it receives from the network 130 (FIG. 1) or from the sink terminal 850.

FIG. 8 also illustrates functional units of a sink terminal 850 that decodes coded video data according to an embodiment of the present disclosure. The terminal 850 may include a receiver 855, a decoder 860, a post-processor 865, a video sink 870 and a controller 875. The receiver 855 may receive coded video data from the channel 845 and provide it to the decoder 860. The decoder 860 may invert coding operations applied by the first terminal's encoder 825 and may generate recovered video data therefrom. The post-processor 865 may perform signal conditioning operations on the recovered video data from the decoder 860, including dynamic range mapping as discussed below. The video sink 870 may render the recovered video data. The controller 875 may manage operations of the sink terminal 850.

As indicated, the receiver 855 may receive coded video data from a channel 845. The coded video data may be included with channel data representing other content, such as coded audio data and other metadata. The receiver 855 may parse the channel data into its constituent data streams and may pass the data streams to respective decoders (not shown), including the decoder 860. The receiver 855 may identify transmission errors in the coded video data that it receives from the channel 845 and, in response, may send error notification messages to the transmitter 830 via a return path in the channel 845. Such transmission errors may include identification of missing configuration parameter sets, which may be identified by the decoder 860 and/or controller 875.

The decoder 860 may generate recovered video data from the coded video data. The decoder 860 may perform prediction and decoding processes. For example, such processes may include entropy decoding, re-quantization and inverse transform operations that may have been applied by the encoder 825. The decoder 860 may build a reference picture cache to store recovered video data of the reference frames. Prediction processes may retrieve data from the reference picture cache to use for predictive decoding operations for later-received coded frames. The coded video data may include motion vectors or other identifiers that identify locations within previously-stored reference frames that are prediction references for subsequently-received coded video data. Decoding operations may operate according to the coding protocol applied by the encoder 825 and may comply with MPEG-4, H.263, H.264 and/or HEVC.

The post-processor 865 may condition recovered frame data for rendering. As part of its operation, the post-processor 865 may perform dynamic range mapping as discussed hereinbelow. Optionally, the post-processor 865 may perform other filtering operations to improve image quality of the recovered video data.

The video sink 870 represents units within the sink terminal 850 that may consume recovered video data. In an embodiment, the video sink 870 may be a display device. In other embodiments, however, the video sink 870 may be provided by applications that execute on the sink terminal 850 that consume video data. Such applications may include, for example, video games and video authoring applications (e.g., editors).

FIG. 8 illustrates functional units that may be provided to support unidirectional transmission of video from a source terminal 810 to a sink terminal 850. In many video coding applications, bidirectional transmission of video may be warranted. In such implementations, each terminal 810, 850 would operate both as a source terminal and a sink terminal. The principles of the present disclosure may accommodate such applications by replicating the functional units 815-835 within the second terminal 850 and replicating the functional units 855-875 within the first terminal 810. Such functional units are not illustrated in FIG. 8 for convenience.

The foregoing discussion has described operation of the embodiments of the present disclosure in the context of source terminals, sink terminals, coders and decoders. Commonly, such devices are provided as electronic devices. Encoders, for example, can be embodied in integrated circuits, such as application specific integrated circuits, field programmable gate arrays and/or digital signal processors. Alternatively, they can be embodied in computer programs that execute on personal computers, notebook or tablet computers or computer servers; such programs are stored in memory systems and executed by processors of such devices. Similarly, decoders can be embodied in integrated circuits, such as application specific integrated circuits, field programmable gate arrays and/or digital signal processors, or they can be embodied in computer programs that execute on personal computers, notebook computers or computer servers. Decoders commonly are packaged in consumer electronic devices, such as gaming systems, smartphones, DVD players, portable media players and the like, and they also can be packaged in consumer software applications such as video games, browser-based media players and the like. The principles of the present disclosure find application with all such devices.

Several embodiments of the disclosure are specifically illustrated and/or described herein. However, it will be appreciated that modifications and variations of the disclosure are covered by the above teachings and within the purview of the appended claims without departing from the spirit and intended scope of the disclosure.

We claim:

1. A coding method, comprising:
   transmitting a plurality of coding parameter sets to a decoder, each coding parameter set having a respective identifier;
   for a new frame of video to be coded, identifying a coding parameter set of the plurality of coding parameter sets to be applied during coding,
   coding the new frame according to the identified coding parameter set, and
   transmitting the coded frame to the decoder along with an identifier of the coding parameter set used during the coding,
   wherein at least two coding parameter sets are valid at an encoder at a common time.

2. The coding method of claim 1, wherein the plurality of coding parameter sets are transmitted in a preamble portion of a video coding session before transmission of a first coded frame.

3. The coding method of claim 1, wherein one of the plurality of coding parameter sets is transmitted in a middle portion of a video coding session after transmission of a first coded frame.

4. The coding method of claim 1, wherein:
   the identifying, coding and transmitting are repeated for each of a plurality of new frames, and
   when successive coded frames are coded using different coding parameter sets, the successive coded frames are transmitted to a decoder without transmission of a coding parameter set between them.

5. The coding method of claim 1, further comprising:
   generating a new coding parameter set;
   determining whether a number of persistent coding parameter sets exceeds a threshold, and
   in response to determining that the threshold is exceeded:
   disqualifying an older coding parameter set; and
   transmitting the new parameter set to a decoder.

6. The coding method of claim 1, further comprising, responsive to a request from a decoder for a missing coding parameter set, retransmitting the missing coding parameter set to the decoder.

7. The coding method of claim 1, wherein the identifying and coding are limited to coding parameter sets that are acknowledged by a decoder.

8. The coding method of claim 1, wherein the coding parameter sets are transmitted in a logical channel having higher reliability than another logical channel in which the coded frames are transmitted.

9. The coding method of claim 1, wherein the identifier has a value that is mathematically related to a parameter contained in the coding parameter set.

10. A non-transitory computer-readable medium storing program instructions that, when executed by a processing device, cause the device to:
    transmit a plurality of coding parameter sets to a decoder, each coding parameter set having a respective identifier;
    for a new frame of video to be coded, identify a coding parameter set of the plurality of coding parameter sets to be applied during coding,
    code the new frame according to the identified coding parameter set, and
    transmit the coded frame to the decoder along with an identifier of the coding parameter set used during the coding, wherein at least two coding parameter sets are valid for coding at a common time.

11. A video coding system, comprising:
a memory for storage of a plurality of coding parameter sets;
a video coder;
a transmitter, and
a controller to control operation of the video coder and transmitter and to:
cause the transmitter to transmit a plurality of coding parameter sets to a decoder, each coding parameter set having a respective identifier;
for a new frame of video to be coded, identify a coding parameter set of the plurality of coding parameter sets to be applied during coding,
cause the coder to code the new frame according to the identified coding parameter set, and
cause the transmitter to transmit the coded frame to the decoder along with an identifier of the coding parameter set used during the coding;
wherein at least two coding parameter sets are valid for coding at a common time.

12. A video decoding method, comprising:
responsive to reception of a plurality of coding parameter sets from an encoder, storing the coding parameter sets in a memory of a decoder in association with identifiers that distinguish the coding parameter sets from each other,
responsive to reception of coded video data of a frame, identifying a coding parameter set identifier from the coded frame data;
decoding the coded frame data using parameters of the identified coding parameter set,
wherein at least two coding parameter sets are valid at the decoder at a common time.

13. The decoding method of claim 12, wherein the plurality of coding parameter sets are received in a preamble portion of a video coding session before reception of a first coded frame.

14. The decoding method of claim 12, wherein one of the plurality of coding parameter sets is received in a middle portion of a video coding session after reception of a first coded frame.

15. The decoding method of claim 12, wherein, when successive coded frames are coded using different coding parameter sets, the successive coded frames are received from the encoder without reception of a coding parameter set between them.

16. The decoding method of claim 12, further comprising, when the identifying indicates that a coding parameter set is missing, transmitting a request for the missing coding parameter set to the encoder.

17. The decoding method of claim 12, further comprising transmitting an acknowledgement of each successfully received coding parameter set.

18. The decoding method of claim 12, further comprising, when the identifier has a value that is mathematically related to a parameter contained in the coding parameter set:
comparing an identifier of a received frame with parameter values in its identified coding parameter set, and
if comparison indicates the received frame's identifier does not align to the parameter according to the mathematical relationship, generating an error condition.

19. A video decoding method, comprising:
responsive to reception of a transmission from an encoder identifying a new coding parameter set, storing the parameter set with an identifier received from the encoder;
responsive to reception of coded frame data, comparing an identifier of a coding parameter set provided with the coded frame data to identifiers of locally stored coding parameter sets,
when a match is identified, decoding the coded frame data according to the locally-stored coding parameter set; and
when no match is identified, requesting the coded parameter set from the encoder.

20. The decoding method of claim 19, wherein a plurality of coding parameter sets are received in a preamble portion of a video coding session before reception of a first coded frame.

21. The decoding method of claim 19, wherein one of the locally stored coding parameter sets is received in a middle portion of a video coding session after reception of a first coded frame.

22. The decoding method of claim 19, further comprising, following storing of a received parameter set, transmitting an acknowledgement message to an encoder.

* * * * *